United States Patent
Hsieh et al.

(10) Patent No.: US 7,757,036 B2
(45) Date of Patent: Jul. 13, 2010

(54) STORAGE CONTROL APPARATUS CAPABLE OF ANALYZING VOLUME INFORMATION AND A CONTROL METHOD THEREOF

(75) Inventors: Hsiang-An Hsieh, Taipei Hsien (TW); Chia-Li Chen, Taipei Hsien (TW)

(73) Assignee: Carry Computer Eng. Co., Ltd., Taipei Hsien (TW)

( * ) Notice: Subject to any disclaimer, the term of this patent is extended or adjusted under 35 U.S.C. 154(b) by 425 days.

(21) Appl. No.: 11/878,326

(22) Filed: Jul. 24, 2007

(65) Prior Publication Data

US 2007/0266219 A1    Nov. 15, 2007

Related U.S. Application Data

(62) Division of application No. 11/039,892, filed on Jan. 24, 2005, now abandoned.

(30) Foreign Application Priority Data

May 18, 2004  (TW) .............................. 93113998 A

(51) Int. Cl.
*G06F 12/00* (2006.01)

(52) U.S. Cl. ................. 711/100; 711/114; 711/154
(58) Field of Classification Search ............... 711/100, 711/114, 154

See application file for complete search history.

(56) References Cited

U.S. PATENT DOCUMENTS 7,089,359 B2 *  8/2006  Kaneda et al. .............. 711/117
7,472,251 B2 * 12/2008  Sasaki ........................ 711/203

* cited by examiner

*Primary Examiner*—Jasmine Song
(74) *Attorney, Agent, or Firm*—Rosenberg, Klein & Lee

(57) ABSTRACT

A storage control apparatus capable of analyzing volume information and a control method thereof is provided. The present storage device controller comprises a volume information analysis module, volume information memory, a display device interface and a power regulation circuit to display the volume information on the display device through the display device interface so that a user can independently read the storage medium and analyze the volume information, regardless of whether it is connected or disconnected.

12 Claims, 7 Drawing Sheets

# STORAGE CONTROL APPARATUS CAPABLE OF ANALYZING VOLUME INFORMATION AND A CONTROL METHOD THEREOF

RELATED APPLICATIONS

This application is a Divisional patent application of co-pending application Ser. No. 11/039,892, filed on 24 Jan. 2005 now abandoned.

BACKGROUND OF THE INVENTION

1. Field of the Invention

The present invention relates to a storage control apparatus capable of analyzing volume information and a control method thereof. This invention provides a storage apparatus control system that can read a storage medium, analyze the storage volume information loaded in the storage medium, control the display apparatus to display the storage volume information, and provides the information for reference by a user.

2. Description of the Related Art

As technology improves, information apparatuses, such as cell phones, notebooks, and personal digital assistants are becoming more and more portable. As such, portable storage apparatuses are also being developed. Because flash memory has been adopted as an industry standard and its manufacturing process is improving constantly, large volume portable storage apparatuses are becoming more and more widespread.

Currently, storage apparatuses that are light, thin, short and small and have large volumes include such draw type storage apparatuses as Zip disks, optical disks and memory cards, etc., and portable storage apparatuses such as portable disks with USB interfaces, external hard disks, etc. A storage apparatus has the sole function of providing memory space upon which information can be recorded. A storage apparatus can only accessed by the operating system. Moreover, draw type transmitting apparatuses such as Zip drives, CD-ROMs and card-reading machines, are transmitting mediums between draw type storage devices and operating systems.

The operation of a portable or draw type storage apparatus such as sector partitioning, sector formatting, reading and writing file, can only be operated and controlled by the operating system. Therefore, storage apparatuses that store information can't display relevant information (such as free space, the volume or a label, etc.) about the storage apparatus itself after it is disconnected from the operating system.

The prior controller embedded in the storage apparatus has the sole function of showing how much memory space is occupied. Please refer to FIG. 1 that shows a schematic diagram of the prior storage control system. The storage control system 10 comprises of a microprocessor unit 11, a host system interface 12, a storage medium interface 13, a data transfer buffer 14, a program memory 15, a data memory 16, a power regulation circuit 17 and a clock oscillation circuit 18.

The host system interface 12 of the storage control system 10 connects to an application system 101. The application system 101 is an information product, for example a computer system or a digital still camera. The storage control system 10 also connects to a storage medium 102 through the storage medium interface 13. The microprocessor unit 11 of the storage control system 10 connects to the application system 101 through the protocol of the host system interface 12, analyzes commands coming from the application system 101, and accesses the storage medium 102. By use of the above method, the application system 101 transmits data to and gets information from the storage medium 102 via the storage control system 10.

The operation of the prior portable or draw type storage apparatus, for example, sector partitioning, sector formatting, reading and writing file, is operated and controlled by the external application system. The drawbacks of the prior art are described below:

1. It is inconvenient for the user. The user can only know what information is stored on the storage apparatus when the storage control system is working and operating through a specified operating system. If the available volume of the storage apparatus is inadequate, the user needs to buy another one or replace it with another type of storage apparatus.
2. The load of the storage system increases. A storage apparatus is a mainstream storage apparatus can't calculate the storage volume and the available volume by itself. It still needs an application system to do this task. This is opposite to the trend of reducing the loading an application system. Moreover, when a draw type storage apparatus, such as a memory card, is applied to a portable device with a limited power source, such as a digital still camera, it must be restarted in order to obtain the residual volume of the storage apparatus. It is wasteful of power to do such a redundant action.

This present invention adds a volume information analysis module, a volume information memory, a display device interface, and a power regulation circuit to the storage control system. The present invention doesn't increase power usage or costs, and achieves the goal of analyzing and displaying the volume information.

SUMMARY OF THE INVENTION

The main objective of the present invention is to provide a storage control system with a volume information analysis module and a volume information memory. The storage control system can access the storage medium by itself regardless of whether the storage apparatus is connected or unconnected and can analyze the volume information of the loading storage apparatus.

Another objective of the present invention is to provide a storage control system with a control-driving interface for the display device. The storage control system can be easily connected to the display device and can display the volume information on the display device.

The present storage control system comprises a storage medium interface, a host system interface, a data transfer buffer, a microprocessor unit, a program memory, a data memory, a volume information analysis module, a volume information memory, a display device interface, a power regulation circuit and a clock oscillation circuit.

The host system interface connects to an application system, the storage medium interface connects to a storage medium, and the display device interface connects to a display device. The power regulation circuit connects to an external power source to regulate and supply the power to all the units in the storage control system. The clock oscillation circuit connects to an external RC resonance circuit to generate a clock and supply the clock to all the units in the storage control system. The control firmware is loaded into the program memory; the microprocessor unit executes the control procedure to control the module process. The control firmware starts up the storage medium analysis, records and displays the storage volume information under the storage apparatus regardless of whether it is connected or disconnected.

During operation, the data memory provides storage space to save the control procedure, the necessary variables and data structures, etc. The volume information memory is used to save the volume information and as a reference when doing analysis. The volume information analysis module is used for analyzing the volume information.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

The present invention is applied to storage apparatuses, such as hard disks, portable disks, etc. The control system of the storage apparatus has a volume information analysis module, a volume information memory, a display device interface and a power regulation circuit, etc. This control system can read the storage volume information loaded in the storage medium when the storage apparatus is disconnected, analyze the storage volume information and display the volume information on the display device through the display device interface as a reference for the user.

Figure 1:
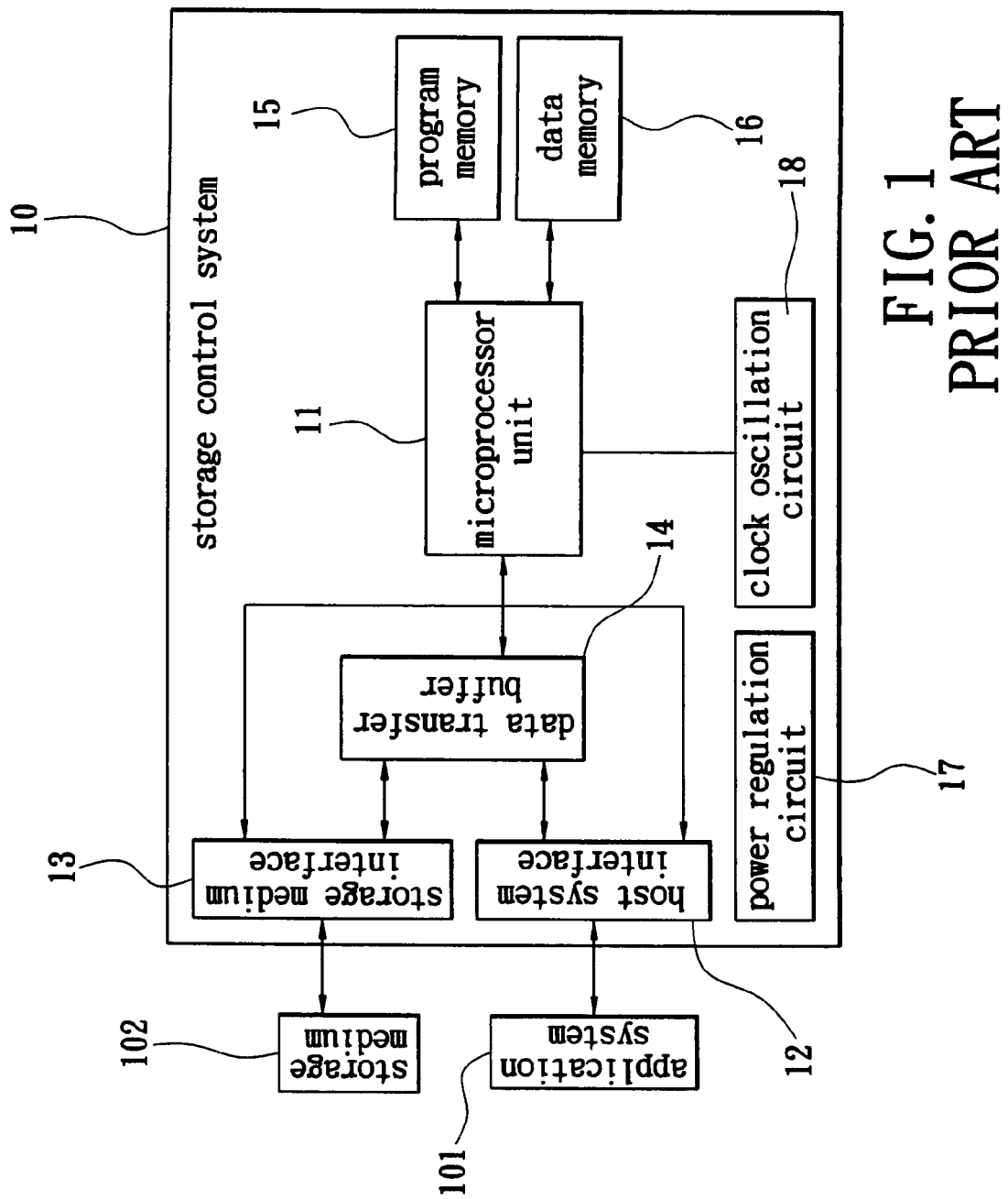
FIG. 1 is a schematic diagram of the prior storage control system.
Figure 2:
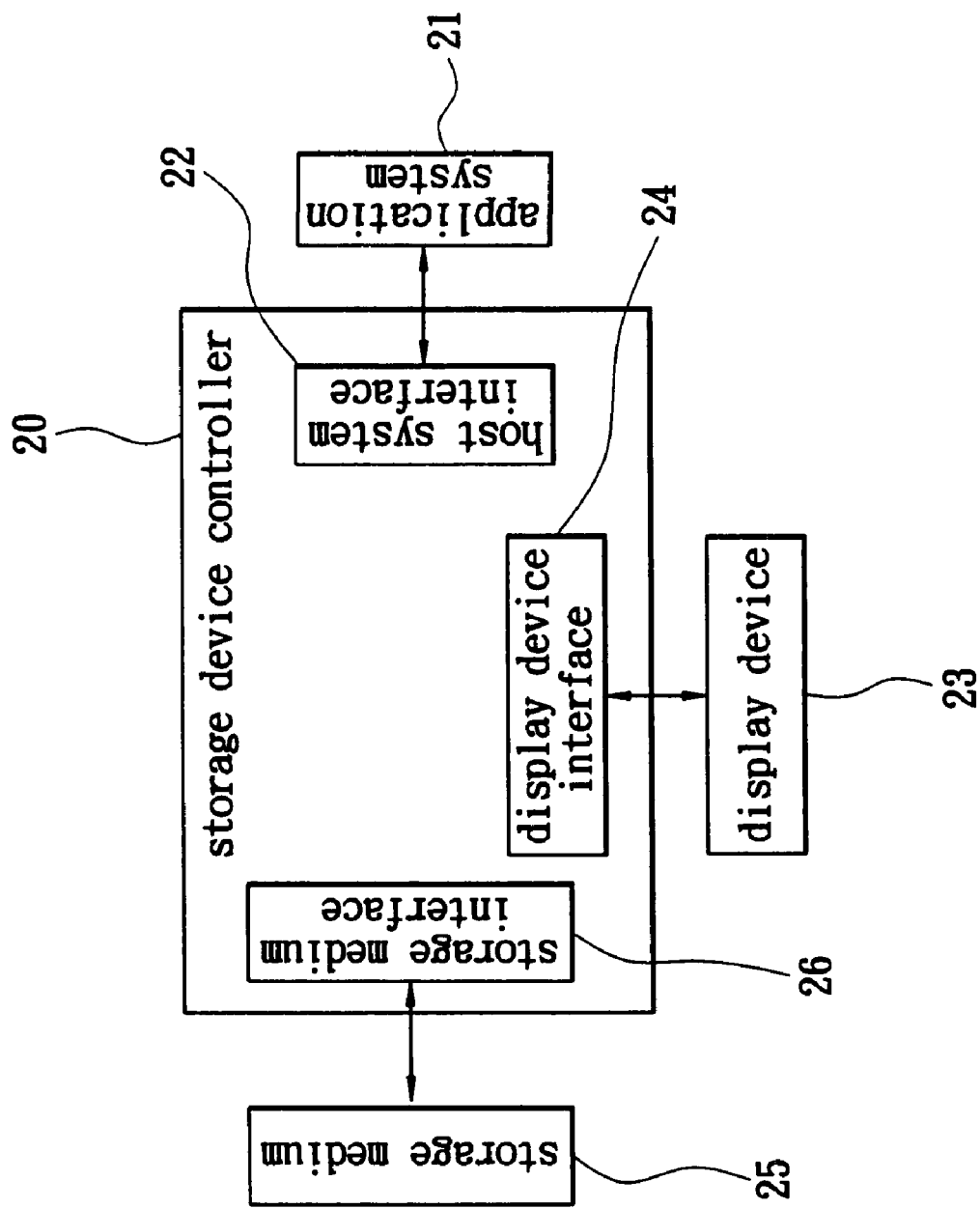
FIG. 2 is a schematic diagram of the present storage control system and its peripheral devices.

Please refer to FIG. 2, which shows a schematic diagram of the present storage control system and its peripheral devices. The storage device controller 20 is a control circuit implemented in an IC, and comprises a plurality of control interfaces that electrically connect to the external apparatuses. The control interfaces include a host system interface 22, a display device interface 24 and a storage medium interface 26, etc. The storage device controller 20 manages the digital information recorded on the storage medium through the host system interface 22 and controls the access processes, for example, reading/writing to the storage apparatus. The storage device controller 20 is built in or is externally connected to a storage medium 25 and analyzes it through the storage medium interface 26. Next, it gets digital information and generates the corresponding storage volume information. Finally, it displays the information on the display device 23.

The storage medium interface 26 is an interface that the storage device controller 20 uses to transmit the digital data to the storage medium 25. The storage medium interface 26 connects electrically to the storage device controller 20 and transmits data to the application system 21 and the display device 23 through the storage device controller 20. The host system interface 22 is an interface that the storage device controller 20 uses to transmit read/write commands to and the digital data uses to access the application system 21, for example a computer system, a portable access device or a portable digital device, etc. The display device interface 24 connects to the display device 23 via a built-in or external method. The storage device controller 20 receives the control signal from the application system 21 and gets the volume information from the storage medium 25. It then displays the storage volume information on the display device 23 as a reference for the user.

Referring to FIG. 2, the application system 21 connects to the storage device controller 20 through the host system interface 22 and connects to the storage medium 25 through the storage medium interface 26. Then the application system 21 analyzes and deals with the information from the storage medium 25, such as its occupied space, residual space, file status and volume label, through a volume information analysis module (not shown in the figure) and displays this information on the display device 23 through the display device interface 24. Please refer to FIG. 3 that shows the best embodiment of the present schematic diagram of the present storage control system. The storage device controller 20 is the dominant frame. The application system 21 connects to the storage medium 25 and the display device 23 through the storage device controller 20, it manages the digital information of the storage medium 25 and controls the process of reading/writing digital information to generate the volume information of the storage. Finally, it displays the volume information on the display device 23. The storage device controller 20 comprises:

a storage medium interface 26, provided as an interface to transmit and access digital information between the storage device controller 20 and the storage medium 25.

a host system interface 22, provided as an interface to transmit and access the commands and the digital information between the storage device controller 20 and the application system 21.

a data transfer buffer 38, connected electrically to the storage medium interface 26, the host system interface 22 and a microprocessor unit 31. The microprocessor unit 31 temporarily saves the data transmitting between the application system 21 and the storage medium 25 by the data transfer buffer 38. The mass data can be transmitted directly between the storage medium interface 26 and the host system interface 22 through the data transfer buffer 38, without passing through the microprocessor unit 31.

a microprocessor unit 31, connected electrically to the module of the storage device controller 20. The microprocessor unit 31 executes the firmware control process that is saved in the program memory, and transmits data to the storage device, the storage medium management, the volume information analysis, and the volume information display etc.

a program memory 34, connected electrically to the microprocessor unit 31. The program memory 34 is used for saving the firmware program of the storage device controller 20 and is used for recording the firmware control process executed by the microprocessor unit 31.

a data memory 35, connected electrically to the microprocessor unit 31. The data memory 35 is used for saving the control variants or the data structure that is necessary for the firmware control process.

a volume information analysis module 33, is used for analyzing the information of the storage medium 25 through the control of the storage device controller 31 to generate the volume information. The volume information analysis module 33 can be integrated with the firmware control process of the microprocessor unit 31 and is executed by the analysis by the microprocessor unit 31.

a volume information memory 32, is a storage space for the volume information. The volume information memory 32 connects electrically to the volume information analysis module 33 and the microprocessor unit 31 and is used for integrating the common data memory to record the volume information.

a display device interface 24, is a data transmission interface between the storage device controller 20 and the display device 23.

a regulation circuit 37, regulates the inputted power and provides the electrical power to the modules included in the storage device controller 20.

a clock oscillation circuit 36, generates an oscillation to produce a clock with a specified frequency and provides the clock to the modules included in the storage device controller 20.

Figure 3:
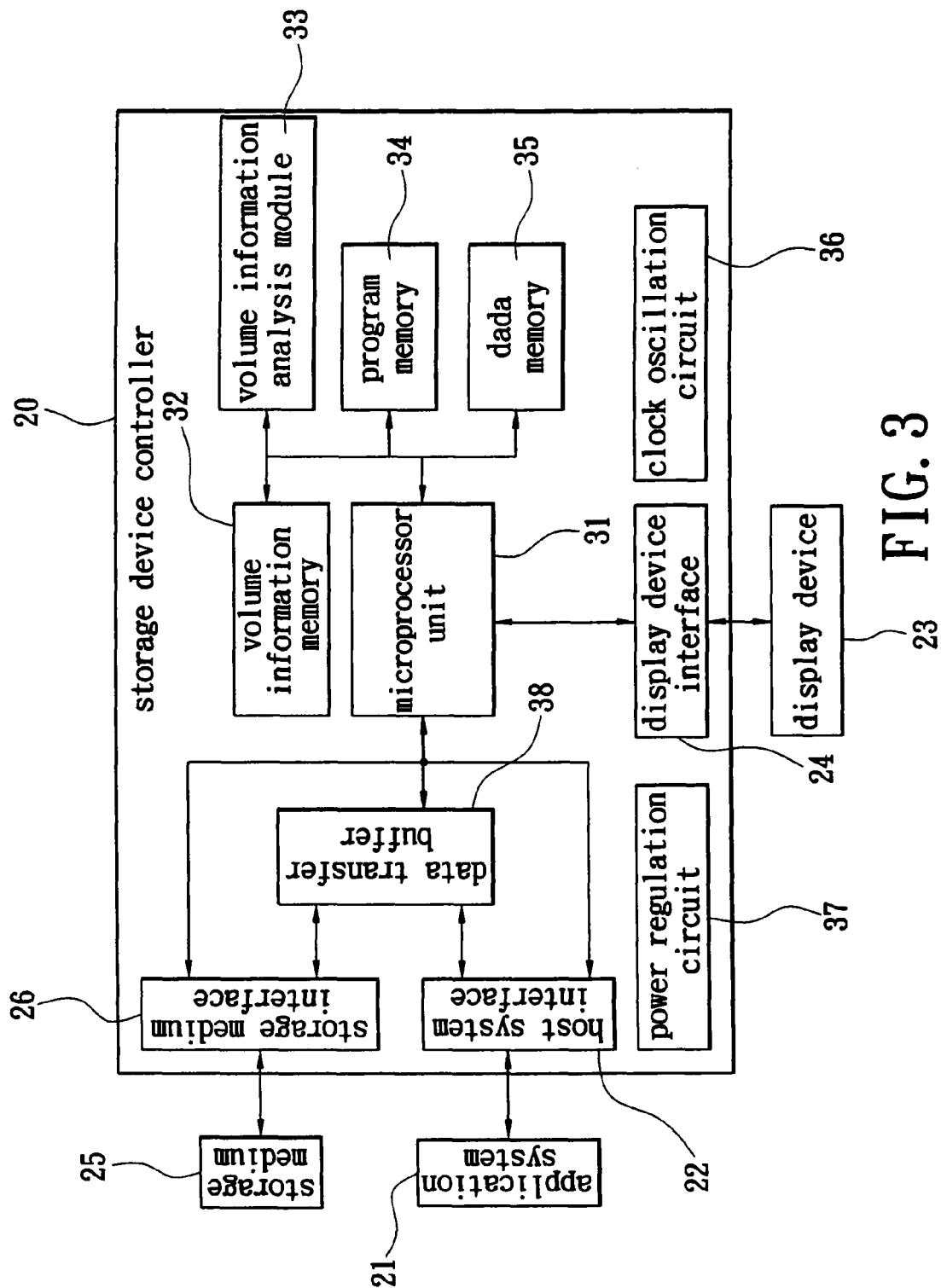
FIG. 3 is a schematic diagram of the present storage control system.

FIG. 3 is an embodiment of the storage device controller 20 with an IC externally connected to the storage medium 25, the application system 21 and the display device 23. The display device 23 displays the volume information of the storage medium 25. The volume information analysis module 33 included in the storage device controller 20 analyzes and generates the volume information according to the information loaded in the storage medium 25. After that, the volume information is saved in the volume information memory 32. The volume information of the volume information memory 32 is provided for comparison with the updated data. The method records the address of the related data saved in the memory and checks whether incoming volume information is the same as the volume information of the volume information memory 32. According to the result, it is decided whether or not to re-display the volume information. Finally, the microprocessor unit 31 displays the update volume information on the display device 23 through the display device interface 24. The volume information includes the partition area, a file system and the volume label of the storage medium 25. Moreover, the volume information analysis module 33 also scans the storage medium 25 to analyze and calculate the status and the occupied space of the storage medium 25 (for example, residual space, occupied space or damaged space, etc.). By reading and scanning the storage medium 25, the updated volume information is obtained. Next, the microprocessor unit 31 displays the volume information on the display device 23 through the display device interface 24.

The built-in or external display device 23 can be a bi-stable liquid crystal display. That means the liquid crystal display can show the stable status by two different methods. In other words, the so-called bi-stable liquid crystal display can display the two stable statuses by changing the incoming voltage and can be distinguished by its optical characteristics. The bi-stable liquid crystal display can update the display information when power is supplied to it, but it can't update the display information when there is no power supply. In this case it latches the lasted information on the screen. Therefore, this display device can display the volume information when it is connected, disconnected or when its power source has been turned off. This allows the user to observe the storage volume information with the least power consumption possible.

Another characteristic of this invention is that the storage device controller 20 can carry out the analysis described previously after the system has been started up and can give a command through the application system 21 to access the storage device 25 and transmit information. The present invention can match up the analysis result of the volume information to detect and judge whether the previous operation affects the application information of the storage volume, directly supports the access operation of the application system when the previous access operation doesn't affect the volume information, so that the original efficiency of the operating system is unaffected. When the previous access operation affects the volume information, this invention can adjust the volume information of the storage device controller 20 according to the information changed by the application system 21 after the application system 21 has finished the access operation and updated the volume information displayed on the display device 23 through the display device interface 24.

This invention also saves the analysis result into the volume information memory 32 when it executes the first time analysis to speed up the update operation. That means it revises the volume information according to the previous volume information saved on the volume information memory 32 and the data written to the storage device by the application system to speed up the analysis and updating the display operation.

The present control method for a storage control apparatus capable of analyzing volume information comprises a storage volume information analysis starting up method and a volume information analysis method as described below.

Figure 4:
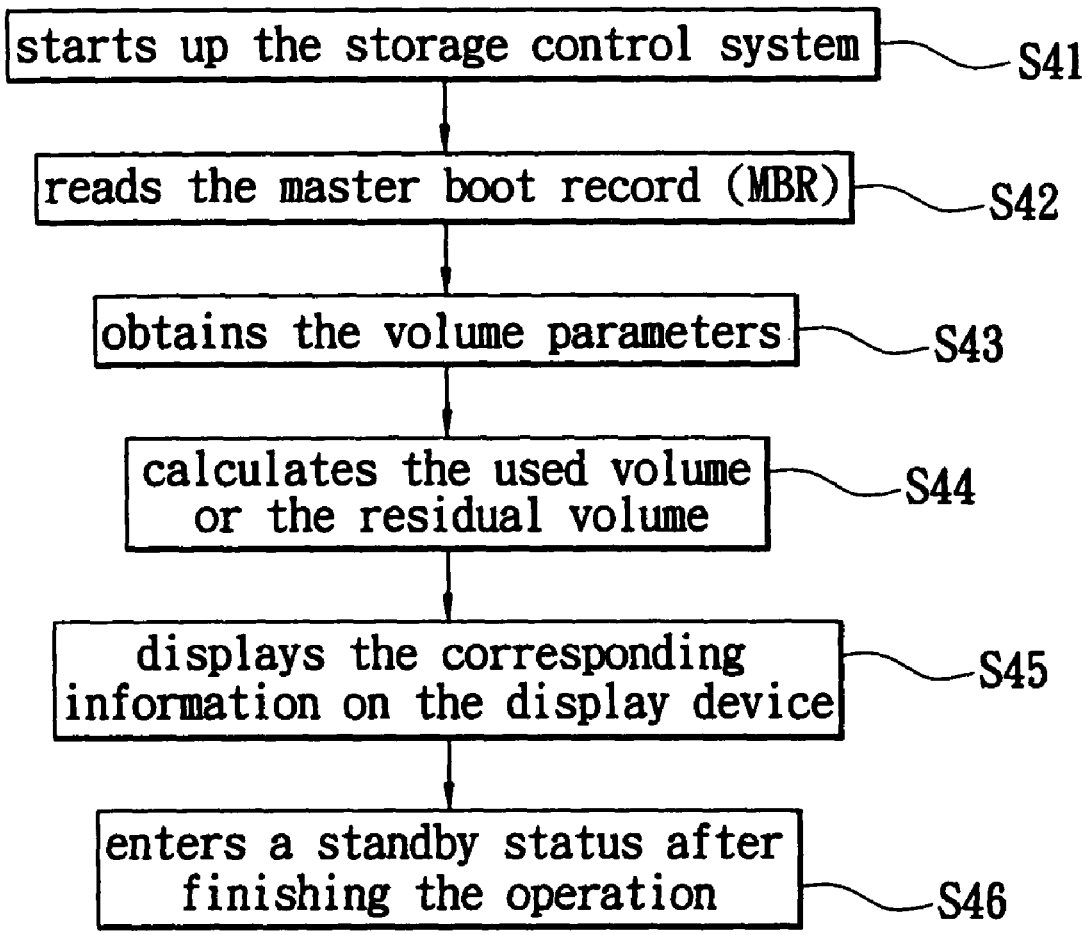
FIG. 4 is a flow chart of the starting-up procedure of the control method of the present storage volume information analysis.

Please refer to FIG. 4 which shows a flow chart for a starting-up procedure for the control method of the present storage volume information analysis. The steps comprises:

Step S41: Turning on the power starts up the storage control system, including the storage medium, the application system and the display device that connects to the storage control system.

Step S42: After the operating system is initialized, the master boot record—the MBR—is read.

Step S43: After the operating system starts up, the storage volume parameters are obtained from the master boot record, e.g. a volume label, or the volume information from the file system.

Step S44: The volume information from the storage volume parameters is calculated, e.g. the used volume or the residual volume.

Step S45: The corresponding information is displayed on the display device through the display device interface.

Step S46: After finishing the operation the device enters standby status to wait for the next starting up procedure.

In order to accelerate the procedure for the volume information analysis, this invention reads the file allocation table (FAB) from the storage medium and saves the data in the volume information memory. Then the microprocessor unit sets and starts up the volume information analysis module and automatically accumulates the used space occupied by the files. The previous process can also be executed by implementing the volume information analysis module with the firmware and can directly execute the analysis via the microprocessor unit. After finishing the analysis, the result of the analysis and the important volume information is saved in the volume information memory, e.g. 1. the master boot record (MBR), 2. the BIOS parameter block (BPB), 3. the volume of the storage device, 4. the residual volume of the storage device. The important volume information in the volume information memory is provided as a reference when updating the volume information to accelerate the speed of the following analysis.

Figure 5:
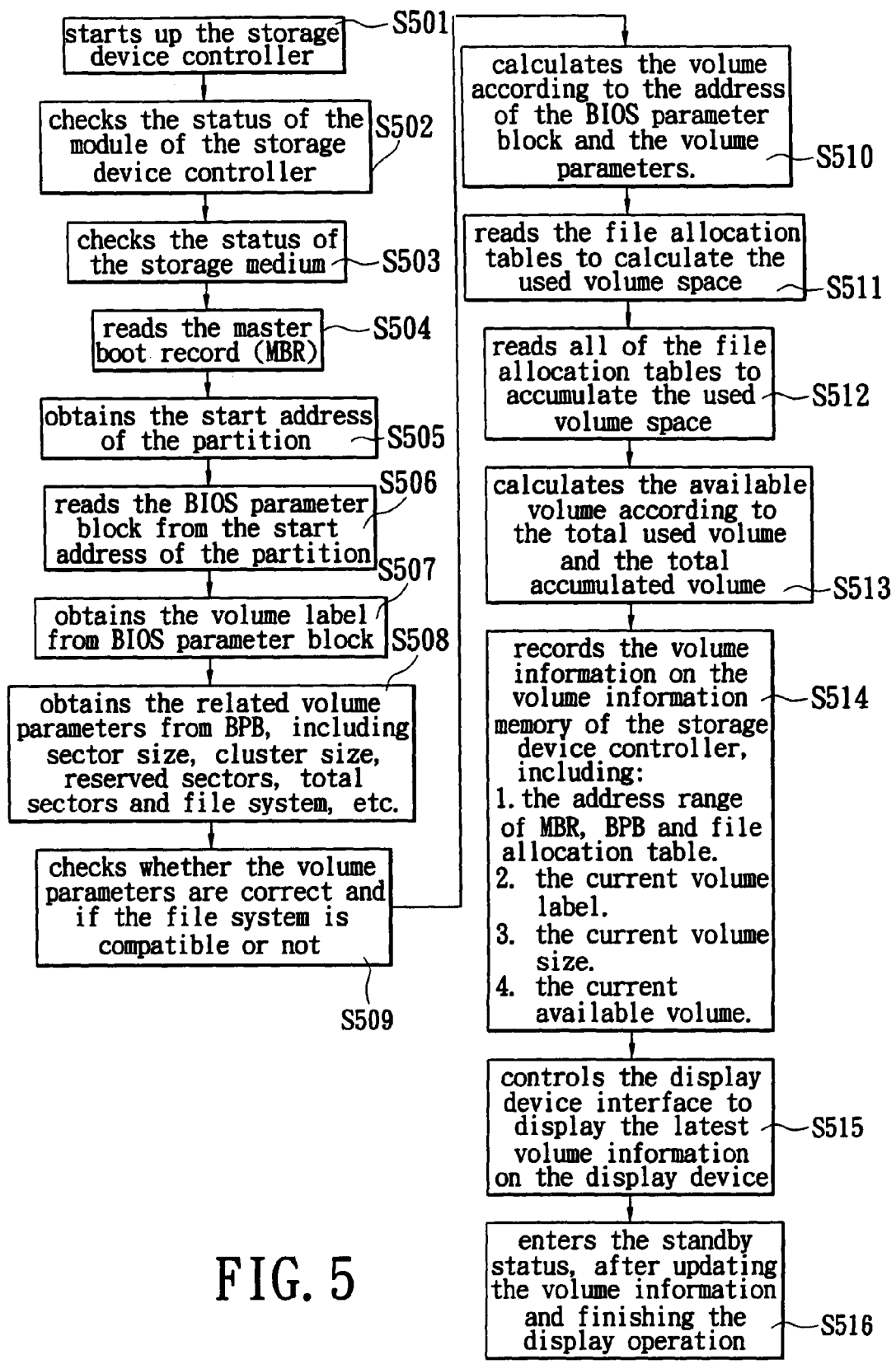
FIG. 5 is a flow chart of the detailed starting-up procedure of the control method of the present storage volume information analysis.

Please refer to FIG. 5, which shows a flow chart for the detailed starting-up procedure for the control method of the present storage volume information analysis.

Step S501: The storage device controller of the storage control system is started up.

Step S502: The status of the module of the storage device controller is checked.

Step S503: The status of the storage medium is checked.

Step S504: The master boot record (MBR) of the storage medium is read. The master boot record stores the partition table. Before the data of the storage medium is accessed, the start and end address of the partition has to be known.

Step S505: The start address of the partition from the master boot record is obtained.

Step S506: The BIOS parameter block from the start address of the partition is read. The BIOS parameter block is located in the first sector of the master boot record and stores the information of the storage medium, e.g. the file system, the boot program and the volume information of the present invention.

Step S507: The volume label from the BIOS parameter block is obtained. The present invention uses the volume label as an identification mark for the storage device by displaying the volume label on the display device. It can also be the code of the user, the name of the user or a number that identifies the user.

Step S508: The related volume parameters is obtained, including its sector size, cluster size, reserved sectors, total sectors and file system, etc.

Step S509: Checks are run to establish whether the volume parameters are correct and if the file system is compatible.

Step S510: The address of the root direction according to the address of the BIOS parameter block and the volume parameters is calculated.

Step S511: The initial address of the file allocation table and the volume size are calculated.

Step S512: All of the file allocation tables are read to accumulate the used volume space and store it on the buffer memory.

Step S513: The total used volume and the available volume are calculated according to the file allocation table.

Step S514: The volume information is recorded onto the volume information memory of the storage device controller, including the address range of the MBR, the BPB and the file allocation table, the current volume label, the current volume size and the current available volume, etc. The volume information memory further includes some volume information that is provided so that the data can be updated later. This means that the volume information memory records the storage address of the previous related data, so that the present invention can quickly check whether the incoming data will affect the volume information or not and judge whether to execute the updating display operation.

Step S515: The microprocessor unit controls the display device interface to display the latest volume information on the display device.

Step S516: After updating the volume information and finishing the display operation, standby status is entered.

Figure 6:
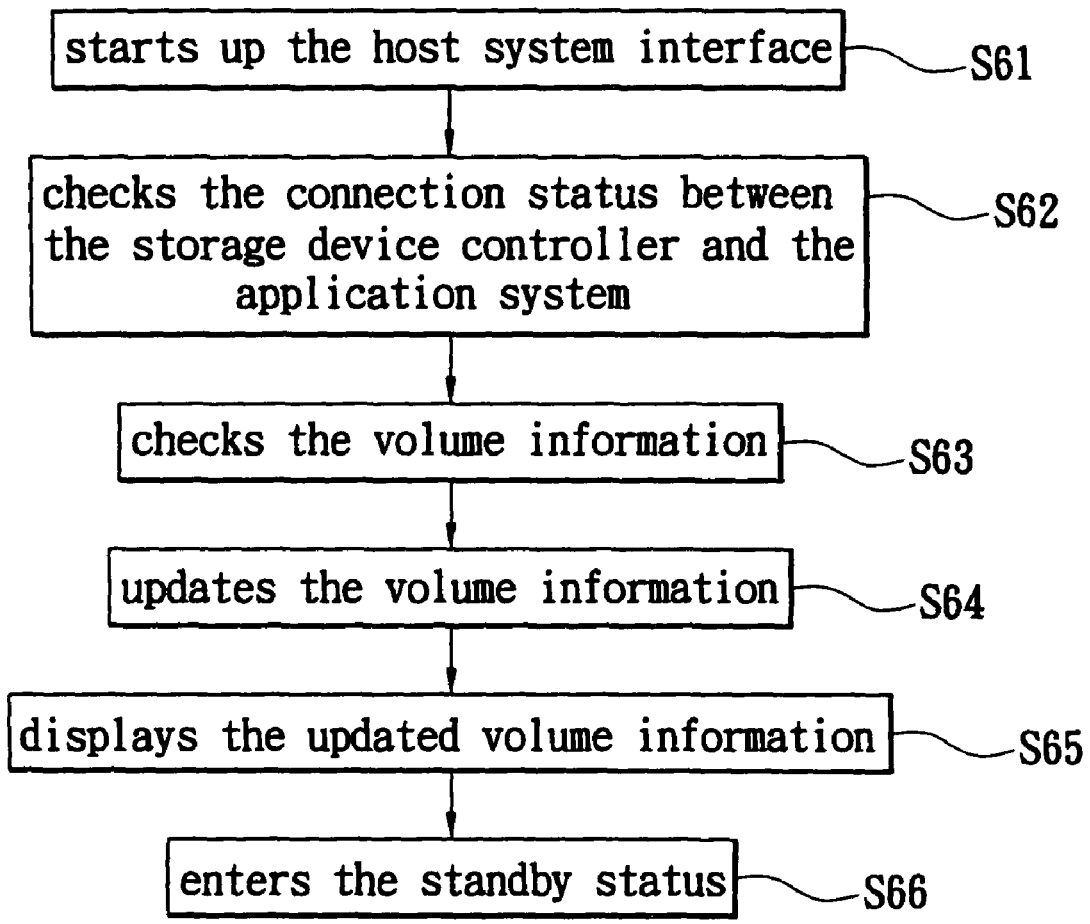
FIG. 6 is a flow chart of volume information analysis of the control method of the present storage volume information analysis.
Figure 7:
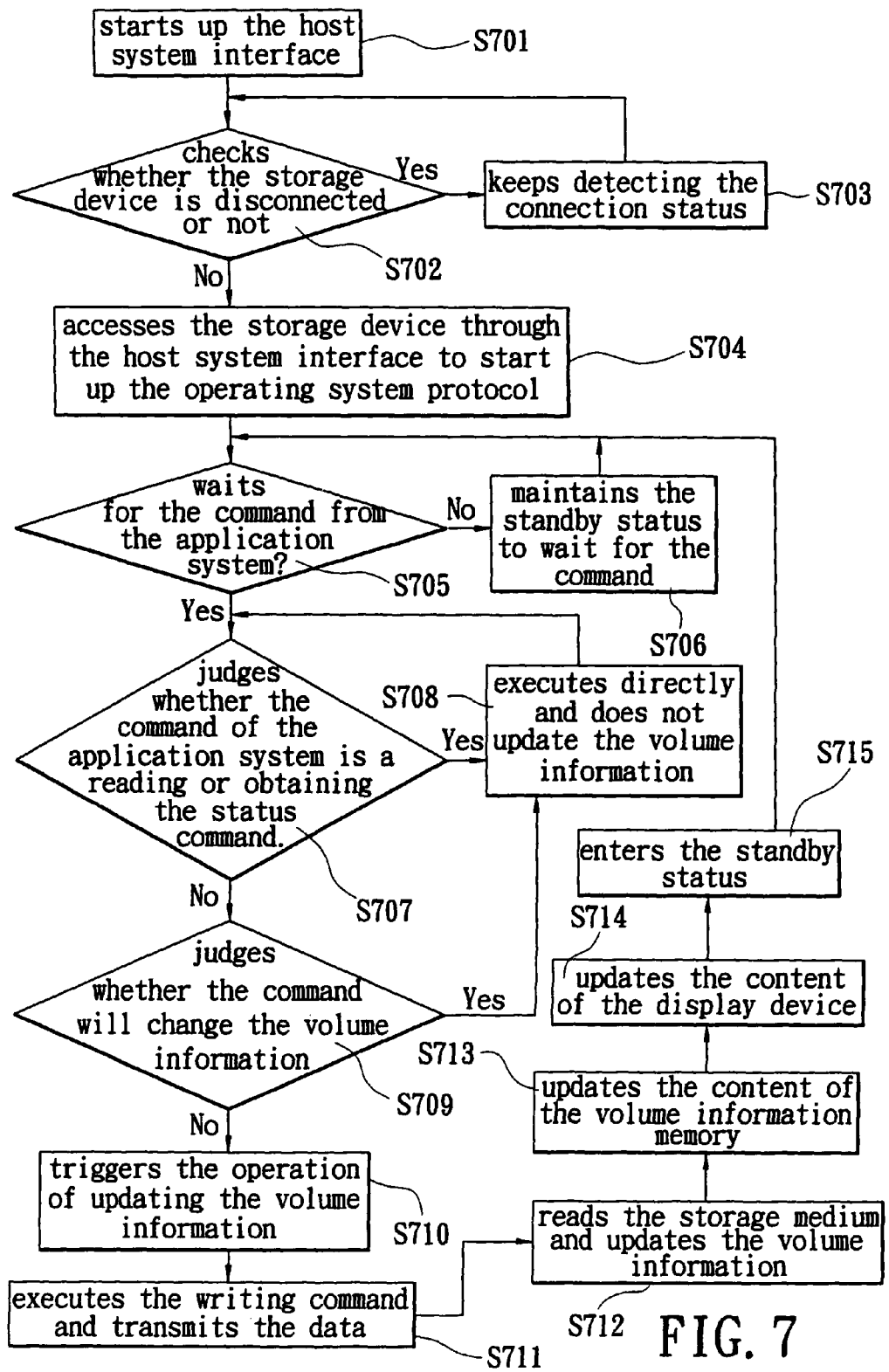
FIG. 7 is a flow chart of detailed volume information analysis of the control method of the present storage volume information analysis.

When the storage device enters standby status, the host system interface starts up and the storage device connects to the application system to execute the volume information analysis procedure, shown in FIG. 6 and FIG. 7. If the storage device is disconnected (meaning that the controller of the storage device isn't connected to the application system), the storage device remains in standby status and maintains displaying the latest volume information.

Please refer to FIG. 6, which shows a flow chart for volume information analysis for the control method of the present storage volume information analysis.

Step S61: The host system interface is started up, meaning that the storage device controller and the control interface of the application system are started up and they wait for the control signal from the application system.

Step S62: The connection status between the storage device controller and the application system is checked. If it is disconnected, it keeps checking for the connection status until it enters connected status.

Step S63: The storage device controller detects whether the volume information has been altered or not. If the volume information doesn't change, the display volume information doesn't need to be updated.

Step S64: If the application system executes an operation to affect the volume information, the volume information is updated.

Step S65: The updated volume information is displayed on the display device.

Step S66: Standby status is entered after the display operation is finished.

Please refer to FIG. 7, which shows a flow chart for detailed volume information analysis for the control method of the present storage volume information analysis. The steps comprises:

Step S701: The host system interface that connects the storage device controller with the application system is started up.

Step S702: The storage device is checked to establish whether it is connected or not.

Step S703: If it is disconnected, the connection status between the storage device controller and the application system will be continually checked until a connection is established.

Step S704: When it is connected, the application system accesses the storage device through the host system interface to start up the operating system protocol.

Step S705: The storage device waits for a command from the application system, for example deleting, saving or formatting, etc. The storage device controller judges whether to update the volume information according to the command from the application system.

Step S706: If the application system does not send a command, standby status is maintained until such time as a command is received.

Step S707: The storage device controller judges whether the command of the application system is a reading command or a getting the status command.

Step S708: If it is a reading command, the volume does not change and the volume information does not need to be updated and the operation returns to step S707.

Step S709: If the command from the application is an action command (e.g. a writing or a deleting command) that will influence the volume information, it is established whether the command will affect the volume information or not. If the command does not affect the volume information, for example overwriting the file, moving the file, or duplicating the file, the volume information is updated and the operation goes back to step S707. In other words, if the application requests a reading information operation or a responding the status operation, the volume information doesn't change. Therefore, the storage device controller can response to the operation instantly and transmit the data according to the parameters of the command.

Step S710: If the writing command of the application system affects the volume information, it triggers the operation of updating the volume information.

Step S711: The writing command is executed and the data is transmitted.

Step S712: The storage device controller compares the range of the writing address to judge whether the address belongs to the address range of the important information, for example, the address of the MBR, the BPB, the root direction, or the sub direction, etc. When the range of the writing address is the same as the previous address range that records the important information, it will affect the important information. The storage device controller records this status and the range of the writing address. Moreover, after finishing the write action and data transmission, the storage device controller reads the storage medium and updates the volume information.

Step S713: The content of the volume information memory is updated. Because the writing operation doesn't affect all of the content of the volume information, the storage device controller only needs to analyze the content that is affected by the writing operation. The storage device controller analyzes and calculates the volume information according to the volume information in the volume information memory and the address range that is changed by the writing operation. Once the latest result is obtained, it updates the volume information in the volume information memory.

Step S714: The content of the display device is updated. This is dependent upon on whether or not the start address of the input data and the length of the input data affect the volume information. If so, the updating operation is executed.

Step S715: Standby status is entered and the operation waits for the next command after finishing the operation.

The present storage device controller is comprised of the volume information analysis module, the volume information memory and a display device interface to display the volume information on the display device through the display device interface as a reference for the user. It independently reads the storage medium and analyzes the volume information. The invention doesn't affect the efficiency of the operating system caused by adding this function to the above procedure, such as recording, comparing and judging and enhances the speed of updating the volume information when the application system changes the storage volume information.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A control method capable of analyzing storage volume information, the method includes a storage volume information analysis starting up method and a volume information analysis method, the control method comprising:
   starting up a storage device controller;
   checking the status of the module of the storage device controller;
   checking the status of a storage medium;
   reading a master boot record (MBR) of the storage medium;
   getting the start address of a partition of the master boot record;
   reading a BIOS parameter block (BPB) of the master boot record (MBR);
   obtaining a plurality of volume parameters;
   updating the volume information and obtaining the volume parameters of a display device;
   and
   executing the volume analysis method, wherein the step of executing the volume analysis method further comprises:
      starting up a host system interface, which is to start up the storage device controller and a control interface of an application system to wait for a control signal from the application system;
      checking the connection status between the storage device controller and the application system;
      detecting whether the volume information has been changed or not;
      updating the volume information when the volume information has been changed;
      displaying the updated volume information on the display device; and
      entering a standby status.

2. The control method capable of analyzing storage volume information of claim 1, wherein the volume information records the information of a master boot record (MBR), a BIOS parameter block (BPB) and a file allocation table (FAT).

3. The control method capable of analyzing storage volume information of claim 1, wherein the volume information at least comprises an available space, a file system and a volume label, the volume information is saved on a volume information memory.

4. The control method capable of analyzing storage volume information of claim 1, wherein the step of displaying the volume information displays the volume information on the display device through a display device interface.

5. The control method capable of analyzing storage volume information of claim 1, wherein the BIOS parameter block (BPB) is located in a first sector of the master boot record (MBR).

6. The control method capable of analyzing storage volume information of claim 1, wherein the volume parameter comprises a sector size, a cluster size, reserved sectors, total volume and a file system.

7. A control method capable of analyzing storage volume information, the method includes a storage volume information analysis starting up method and a volume information analysis method, the control method comprising:
   starting up a storage device controller;
   checking the status of the module of the storage device controller;
   checking the status of a storage medium;
   reading a master boot record (MBR) of the storage medium;
   getting the start address of a partition of the master boot record;
   reading a BIOS parameter block (BPB) of the master boot record (MBR);
   obtaining a plurality of volume parameters;
   updating the volume information and obtaining the volume parameters of a display device; and
   executing the volume analysis method, further comprising:
      starting up a host system interface that connects a storage device controller with an application system;
      checking whether the storage device is disconnected or not;
      waiting for a command from the application system;
      judging a status of the command from the application system;

triggering the operation of updating the volume information;

executing the writing command and transmitting the data;

updating the content of the volume information in a volume information memory;

updating the content of the display device; and entering a standby status to wait for a next command.

8. The control method capable of analyzing the storage volume information of claim 7, wherein the step of checking whether the storage device is disconnected or not, if it is disconnected, the connection status between continually monitors the storage device controller and the application system until a connection is detected, if it is connected, the application system accesses the storage device through the host system interface to start up the operating system protocol.

9. The control method capable of analyzing the storage volume information of claim 7, wherein the storage device controller judges whether to update the volume information according to the command from the application system, if the application system does not send a command, it maintains its standby status and waits for the command.

10. The control method capable of analyzing the storage volume information of claim 7, wherein when the application gives a reading command, there is no need to update the volume information.

11. The control method capable of analyzing the storage volume information of claim 7, wherein the step of triggering the operation of updating the volume information is dependent upon on whether the start address of the input data and the length of the input data affect the volume information, if so, the updating operation is executed.

12. The control method capable of analyzing the storage volume information of claim 7, wherein the step of entering the standby status to wait for next command is a step of entering a waiting for command from the application system status.

* * * * *